United States Patent [19]

Mellish

[11] Patent Number: 5,256,744
[45] Date of Patent: Oct. 26, 1993

[54] DRYING TEMPERATURE INDEPENDENT POLYTETRAFLUOROETHYLENE

[75] Inventor: Walter G. Mellish, Livingston, N.J.

[73] Assignee: ICI Americas Inc., Wilmington, Del.

[21] Appl. No.: 967,605

[22] Filed: Oct. 28, 1992

Related U.S. Application Data

[62] Division of Ser. No. 643,409, Jan. 18, 1991, Pat. No. 5,185,414.

[51] Int. Cl.$^5$ ............................................. C08F 214/26
[52] U.S. Cl. ........................................ 526/87; 526/247; 526/255
[58] Field of Search ........................... 526/87, 247, 255

[56] References Cited

U.S. PATENT DOCUMENTS

| | | |
|---|---|---|
| 3,088,941 | 5/1963 | Uhland . |
| 3,163,628 | 12/1964 | Bolstad . |
| 3,391,099 | 7/1968 | Punderson . |
| 3,607,878 | 9/1971 | Grimaud et al. . |
| 3,692,759 | 9/1972 | Ocone . |
| 3,819,594 | 6/1974 | Holmes et al. . |
| 3,829,305 | 10/1974 | Moore . |
| 3,951,930 | 4/1976 | Downer et al. . |
| 4,530,981 | 7/1985 | Malhotra et al. . |
| 4,861,845 | 8/1989 | Slocum et al. . |
| 4,914,146 | 4/1990 | Honda et al. . |
| 4,921,922 | 5/1990 | Attwood et al. . |

FOREIGN PATENT DOCUMENTS

| | | |
|---|---|---|
| 451833 | 10/1948 | Canada . |
| 0111342 | 6/1984 | European Pat. Off. ............ 526/255 |
| 1397931 | 6/1975 | United Kingdom . |

Primary Examiner—Joseph L. Schofer
Assistant Examiner—N. Sarofim

[57] ABSTRACT

The present invention is directed to a product and method of incrementally adding comonomers to co-polytetrafluoroethylene (PTFE) by an improved process, resulting in a PTFE product independent and/or much less dependent upon drying temperatures. The improved PTFE exhibits increased green strength at substantially constant extrusion pressures and an extrusion pressure that is substantially independent of drying temperatures of the wet PTFE.

7 Claims, No Drawings

DRYING TEMPERATURE INDEPENDENT POLYTETRAFLUOROETHYLENE

This is a divisional of co-pending application Ser. No. 07/643,409 filed on 18 Jan. 1991, now U.S. Pat. No. 5,185,414.

BACKGROUND OF THE INVENTION

The present invention is directed to the production of drying temperature independent co-polytetrafluoroethylene (PTFE) powder in combination with trace copolymers, effected by charging the reaction vessel with reactants at incremental intervals. The trace copolymers in the PTFE are defined as small amounts of comonomers, less than 1.0 weight percent.

The PTFE art is aware of several variables in need of control to produce consistent high yield products with varying grades of quality, dependent upon the desired PTFE use. Generally, initial reactants are brought together in an autoclave, the time, temperature, and pressure of the reaction being carefully controlled and monitored. At appropriate times certain additional reactants and/or catalysts are added to the mixture to complete the reaction. The autoclave is allowed to cool to room temperature and the "wet" reaction products deposited into drying ovens. In the present invention the fine powder resin was made by polymerizing tetrafluoroethylene (TFE) in an aqueous medium under conditions which maintain the polymer dispersed as fine particles, from 0.05 to 1.3 microns in diameter, until the polymerization reaction is completed. The resultant aqueous dispersion can then be coagulated, dried and subsequently used in this form for extrusion.

An important property of the PTFE fine powder is the force required to extrude a paste through a forming means such as an extrusion die. This force is known as extrusion pressure. The extrusion pressure required to make acceptable extrudate is inversely related to the reduction ratio of the extrusion die. It is known to those skilled in this art that variations in extrusion pressure may be obtained by varying the drying temperature. These variations indicate that the extrusion pressure may therefore be functionally related to drying temperature. This functional relationship is relied on to produce PTFE powder of different grades for many of the useful purposes found for this copolymer. Knowledge of this relationship aids in the control, much like fine tuning, over trimming of the extrusion pressure and therefore control over the effective reduction ratio. This control provides the fine tuning required to produce consistent extrudates.

As a general description of this product reaction, coagulated dispersions or fine powders of PTFE are made by initiating an aqueous dispersion polymerization with free radical peroxide catalysts. The polymerization is kept under constant tetrafluoroethylene (TFE) pressure in a pressurized vessel or autoclave. The resultant PTFE is in latex form and is later coagulated to a fine powder of about 500 microns in diameter by mechanical agitation. The powder is separated from the water in the product mixture with a separation screen. The fine powder is dried, mixed with about 17% by weight naptha or kerosene type lubricant and extruded. The extrusion pressure is determined by: the primary particle size of the PTFE particles in the dispersion, the incorporation of a comonomer in the polymerization, and by the drying temperature.

A major determinant for the extrusion pressure of PTFE fine powder is the primary particle size made in the autoclave. This may be controlled by the concentration of catalyst (number of growth sites) and the concentration of the wetting and/or stabilizing agent in the autoclave during the first 8% of reaction or TFE transfer. For example, for low extrusion pressure fine powder, large primary particle sizes are desired. To achieve the large primary particle sizes, small concentrations of catalyst and small concentrations of wetting agents are desired. The small quantities provide proportionately fewer growth sites, enabling the growth of larger particles. To achieve high extrusion pressure fine powder small primary particle sizes are desired.

By way of example only, low extrusion pressures were obtained when 0.037 weight percent ammonium perfluorooctanate (APFO) were added. To achieve high extrusion pressures with a 0.1 weight percent APFO addition was necessary. In the same manner low extrusion pressures are obtained in the presence of 0.011 weight percent ammonium persulfate (APS) catalyst and high extrusion pressures were obtained in the presence of 0.049 weight percent APS.

Generally, the higher the drying temperature the higher the resultant extrusion pressure. This influence on extrusion pressure is not as great as changing the concentration of the reactants in the autoclave. The drying temperature hones extrusion pressure within the desired range for a particular grade of PTFE. The calculus for this relationship approximates for every 20 degree centigrade increase in drying temperature, the extrusion pressure rises by approximately 10.6%. The converse is true for decreasing drying temperature. This relationship is obtained within the temperature range of greater than 100 degrees centigrade to about 280 degrees centigrade.

Controlling extrusion pressure with drying temperatures has several drawbacks. Firstly, drying time varies inversely with temperature. Therefore, as drying temperatures rise drying times decrease. By way of example, for a drying temperature of 250 degrees centigrade after about 5 hours of warm up time the oven load needs to be at temperature for approximately 8 hours. For a drying temperature of 120 degrees centigrade a warm up time of about 5 hours is needed, however, the oven load requires approximately 24 hours of drying time. This time differential has a large impact on a commercial operation since the lower drying temperature has a major impact on throughput and plant capacity. In this above example the lower drying temperature increases the drying time per batch by more than doubling the time required.

Secondly, to obtain the lowest extrusion pressures drying must be done at the lowest drying temperatures, as for example at the 120 degree centigrade temperature regime. The additional problem at these drying temperatures is that it is close to the vapor phase of water and difficult, therefore, to insure a specified dryness, known as "bone" dry. If bone dryness is not achieved the product will have inconsistent extrusion properties when mixed with the organic extrusion vehicles. The difference in a few degrees centigrade in this regime can be quite dramatic. When dried at 120 degrees centigrade about 6.4 weight percent of the net product will be "wet" or not bone dry. When dried at 150 degrees centigrade about 1 weight percent of the product will be wet. The water contained therein is not homogeneous throughout thereby resulting in inconsistencies of extrusion pressures of the resultant product.

There has been a need in this art for a drying temperature independent or a much less dependent process to produce the desired grades of PTFE. The invention herein disclosed is a discovery of that nature, wherein the resultant PTFE powder extrusion pressure is independent of or exhibits very little dependence on product drying temperature and time. An additional benefit is realized since green strength can be increased while maintaining a substantially constant extrusion pressure. This new process produces a product useful in the same fields of use as any grade of PTFE. Since the new PTFE copolymer extrusion pressure is independent or less dependent on drying temperature the new process is more economical. The uses for the PTFE powder range from tubing and wire coatings, to other useful protective linings such as pipe lining and article wrapping.

SUMMARY OF THE INVENTION

In the practice of this invention, reactants normally charged into the reaction vessel are charged in a plurality of incrementally variant times thereby producing a PTFE powder with extrusion pressures independent of and/or much less dependent upon, by 20, 40, 60 and/or 80%, the wet PTFE drying temperatures and times. The components to make the PTFE from tetrafluoroethylene (TFE) comprise: catalysts, such as ammonium persulfate (APS), potassium persulfate (KPS), and preferably disuccinic acid peroxide (DSAP), combination thereof and/or therebetween and comonomers such as but not limited to perfluoroalkenes, chlorotrifluoroethylene, dichlorodifluoroethylene, hexafluoropropene (HFP), preferably perfluoro(n-propyl vinyl ether) (PPVE) combinations thereof and/or therebetween. Other useful comonomer species comprise perfluoroalkyl trifluoroethylene of 3 to 10 carbon atoms and oxyperfluoroalky trifluoroethylenes of 3 to 10 carbon atoms and/or some combination thereof. The comonomer content ranges from 0.03 to 1.0 weight percent, preferably 0.113 to 0.200 weight percent, and most preferably 0.140 to 0.143 weight percent. Weight percentages are measured by the Fourier Transform Infrared (FTIR) analysis, known by those skilled in this art and as described in U.S. Pat. No. 3,819,594 herein incorporated by reference.

The mean particle sizes range in diameter from 0.05 to 1.30 microns, preferably 0.10 to 0.75 microns, and most preferably 0.20 to 0.60 microns. Particle size ranges have been measured by the method described in U.S. Pat. No. 3,391,099, herein incorporated by reference.

The standard specific gravity (SSG) of the PTFE products range from less than 2.1750, preferably less than 2.1700 and most preferably between and including the ranges 2.1520 to 2.1630. The method of measuring SSG is the ASTM standard method ASTM D792. The measured samples were prepared by the ASTM standard method ASTM D1457.

The APFO concentration was added to water in the reaction vessel in increments, preferably in two increments. The first increment may reside between 0 to 0.105 weight percent on water, preferably between 0.0060 and 0.0210 weight percent on water. The second incremental addition ranges between 0.020 and 0.60 weight percent on water, preferably between 0.100 and 0.200 weight percent on water. Wax was added to the autoclave. The autoclave was then evacuated of residual gases.

The 60% of the total comonomer addition to be added to the autoclave, for example PPVE, was blown into the autoclave with nitrogen gas. It is contemplated that the comonomer may be added in additional increments and/or variant incremental amounts. The major component added to the reaction mixture is TFE, added by a pressurized means, to bring the pressure of the autoclave up to operating pressures of approximately 265 psig ($6.8947 \times 10^4$ dynes/cm$^2$). The TFE was continually added to maintain a constant pressure until all components had been added and the reaction was complete.

The catalysts range from $9.00 \times 10^{-5}$ to 0.200 all measured in weight percent on water. The preferred catalyst is a combination of DSAP and APS. The preferred DSAP catalyst range is $1.4 \times 10^{-3}$ to 0.16, the preferred APS catalyst range is $9.0 \times 10^{-5}$ to $9.5 \times 10^{-3}$. The most preferred DSAP/APS weight percent on water is $7.33 \times 10^{-3}$ plus or minus 15% DSAP and $4.62 \times 10^{-4}$ APS plus or minus 15%, while maintaining the relative ratio of DSAP/APS of approximately 15.9.

Temperature and time profiles are important monitored parameters during the reaction. The preferred start temperature is within the 71 to 77 degree centigrade temperature range, dependent upon water cleanliness and oxygen content. The autoclave temperature is controlled to rise from about 1.5 to 2.5 degrees centigrade during approximately the first 12% of the TFE transfer. The peak temperature is attained at about the 12% of total TFE transfer and is typically about 1.5 to 2.5 degrees higher than the start temperature. Other temperature profiles are operable within the start temperature ranges of about 60 to the upper 90 degree centigrade temperature range, changing therefore the reaction rate which may result in a change in the polmyer molecular weight distribution. Just prior to the temperature peak, at 10 percent of the total amount of TFE to be transferred, the second incremental addition of APFO was injected into the autoclave.

After the temperature peak, cooling is controlled to about 0.05 to 0.3 degrees centigrade per minute, preferably 0.1 degree centigrade per minute. As those skilled in this art know, the temperature cooling period is critical for batch control. Typical temperature and time profiles for the reaction indicate that over about a three hour time period a gradual fall in the temperature is controlled over an approximate 6 to 9 degree centigrade temperature range from about 77 to about 68 degrees centigrade. At the 12% of the total TFE to be transferred the temperature was controllably ramped down.

As the comonomer was consumed, the reaction rate and rate of heat evolved tended to increase. A critical time period usually occurs between about the 12 to 56% of the total amount of TFE to be transferred. During this critical time, the temperature was modulated to insure a controlled reaction rate. The ramp down was continued until about 74 % of the total TFE to be transferred was transferred. The pressure remained constant throughout the reaction time period as the TFE charge was continually added to maintain the constant reaction pressure.

At greater than about 74% of the total TFE to be transferred into the autoclave, the temperature was controllably increased by 2 to 4 degrees centigrade until about 82% of the total TFE to be transferred was charged into the autoclave. At about this 82% TFE transfer, the remaining PPVE held back from the initial PPVE charge was injected into the autoclave over a controlled time frame of 2 to 3 minutes. It is contemplated that this injection may be controllably added to the autoclave over a greater time period in smaller incremental units. It is additionally contemplated that the additional incremental charges of the comonomer may be transferred at lesser or greater amounts of TFE transferred. The 40% PPVE injection was the final addition to the autoclave. The reaction temperature was maintained during this final reaction phase until the reaction was complete.

After completion of the reaction and subsequent cooling to room temperature, the product was separated from unreacted admixtures. In particular, the wax that was added after the initial APFO addition, above. The now separated product, latex in this form, was diluted with water and the mixture was then coagulated by vigorous mechanical shear such that the mean particle size of the wet polymer was approximately 500 microns in diameter. This resulted in wet polymer, known as coagulated dispersing or also known as "CD". The polymer was then separated from the mixture by a dewatering screen.

The polymer was placed on trays for drying. The drying temperature range was approximately 110 to 280 degrees centigrade. Preferably, in the practice of the present invention the drying temperature is approximately between 190 to 260 degrees centigrade, most preferably between about 220 to 260 degrees centigrade. In practicing the present invention, these temperature ranges were employed independent of the desired extrusion pressures of the bone dry product. As a result, the bone dry product was obtained in approximately half the drying time required by the prior art.

An added benefit to the incremental injection of PPVE into the autoclave as practiced by this invention was the 22% increase in the green strength of the extrudate as the extrusion pressure remained substantially constant. As those skilled in this art will appreciate, the additional green strength in the extrudate facilitates extrudate workability. The extruded piece was capable of enhanced drawability and handleability.

Importantly, the practice of this invention results in a product with properties not before known in this art. Prior hereto an increase in the green strength of the CD paste required a corresponding increase in the extrusion pressure to enable forming the CD paste by extrusion means. As those skilled in this art recognize, the limit of green strength available was necessarily limited by the ability to form CD paste by extrusion means. In the practice of the present invention, green strength can be increased while maintaining the extrusion pressure at a substantially constant value. As the green strength is increased the extrusion pressure remains substantially constant over a temperature range of 150 to 250 degrees centigrade. The green strength can be increased 20, 40, 60, and/or 80 percent as the extrusion pressure remains substantially constant. As a result, CD paste green strength is no longer substantially limited by the ability to form the CD paste by extrusion means. Other forming means, known to those skilled in this art, will benefit from this green strength property due to the enhanced handleability and workability of the CD paste.

DESCRIPTION OF THE PREFERRED EMBODIMENTS

The following Examples are presented to further illustrate the invention and are not intended to limit the scope of the invention.

EXAMPLE 1

In Example 1, 0.0066 percent by weight on water of APFO was added to excess water in a 75 degree centigrade autoclave. Next wax (Shell Wax 100, Shell Oil Company) in the amount of 0.96 percent by weight on water was added. A vacuum was pulled to 16 inches of Hg (41 centimeters of Hg) and held for thirty minutes with the autoclave stirrer running. The autoclave reaction site was isolated from the vacuum source and the initial amount of PPVE was added by pushing the PPVE into the autoclave with 20 atmospheres gauge of pressurized nitrogen gas at 60% of the total charge of PPVE to be transferred. The autoclave reaction site was then pressurized with TFE to a constant 18 atmospheres gauge until the reaction was complete. DSAP and APS catalysts are mixed together in water until dissolution in a ratio of 15.9 to 1, DSAP to APS respectively, the concentration of APS in the autoclave $4.62 \times 10^{-4}$ percent by weight on water. The reaction was initiated upon addition of the catalyst. The autoclave temperature was allowed to increase two degrees centigrade to a constant temperature of 77 degrees centigrade.

At 10 percent of total TFE to be transferred, 0.144 percent by weight on water of APFO was pumped as an aqueous solution into the autoclave. TFE was continually added to maintain a constant pressure until 82 percent of the total amount of TFE to be transferred was transferred. During this time period the temperature was ramped down from 77 to 68 degrees centigrade. The remaining amount of PPVE, 40 percent of the total amount to be transferred, was added. The reaction was continued until all of the TFE was added. During the last addition the autoclave temperature was ramped up from 68 to approximately 73 degrees centigrade. The total amount of TFE was 29 percent by weight on water and the total amount of PPVE was one part of PPVE to 523 parts of TFE. The batch was allowed to cool to room temperature. Upon cooling the wax separated from the PTFE latex product. The latex was removed from the autoclave, diluted with water and coagulated to a 450 micron mean particle size, the latex was converted to a PTFE slurry. The solids were separated from the water with a dewatering screen. The solids were then oven dried at approximately 140, 150, and 160 degrees centigrade for 20, 19, and 18 hours, respectively.

EXAMPLE 2

In Example 2, the procedure outlined in Example 1 was generally followed except that the drying temperature range was extended to the higher end of the drying temperature limits. Temperatures investigated in this Example included 220 and 250 centigrade temperatures at shorter drying times of 13 and 12 hours, respectively. The extrusion pressure and green strength results are exhibited in Table 1.

Table 1 shows the results of drying temperature, extrusion pressure, and green strength of Examples 1 and 2. Note that normally, as in the prior art, the extrusion pressure increases by 10.6 percent per 20 degree centigrade increase in drying temperature. Table 1 indicates that the 10.6% vs 20 degree relationship has improved in the practice of the present invention whereby the sensitivity of extrusion pressure versus drying temperature is decreased by an average of approximately 150%. Note that Table 1 shows almost constant extrusion pressures with increasing green strength as the drying temperature increases. The extrusions in Table 1 were performed with a Jennings Horizontal Tubing Extruder at a reduction ratio of 407:1, using a die of 30 degree included angle.

TABLE 1

| Drying Temp. | Drying Time | Extrusion Pressure | Green Strength |
|---|---|---|---|
| Example 1 | | | |
| 140 | 20 | 7650 | 1709 |
| 150 | 19 | 7700 | 1681 |
| 160 | 18 | 7950 | 1813 |
| Example 2 | | | |
| 140 | 22 | 7600 | 1813 |
| 160 | 19 | 7400 | 1704 |
| 220 | 13 | 8000 | 1961 |
| 250 | 12 | 8600 | 2208 |

I claim:

1. A method of making a coagulated dispersion of an extrudable copolymer of tetrafluoroethylene and from 0.03 to 1.0 weight percent of a comonomer selected from the group consisting of perfluoroalkenes, chlorotrifluoroethylene, dichlorodifluoroethylene, hexafluoropropene, perfluoro(n-propyl vinyl ether), perfluoroalkyl trifluoroethylene of 3 to 10 carbon atoms and oxyperfluoroalky/trifluoroethylenes of 3 to 10 carbon atoms, said method comprising charging tetrafluoroethylene and water to an autoclave, adding said comonomer in a plurality of incremental intervals to said autoclave while polymerizing under conditions so as to produce polymer dispersed as fine particles of from −0.05 to 1.3 microns in diameter, and coagulating the dispersed polymer.

2. The method of claim 1 wherein said comonomer is added in a first and a second incremental interval, said first interval added as 60 percent of the total comonomer to be added increment and said second interval added as the remaining 40 percent of the total comonomer to be added increment to said autoclave.

3. The method of claim 2 wherein said first interval is added at the time the initial charge of tetrafluoroethylene is added to said autoclave.

4. The method of claim 2 wherein said second interval is added when about 82% of the total amount of tetrafluoroethylene to be transferred was charged into the autoclave.

5. The method of claim 1 wherein said comonomer is selected from the group consisting of perfluoroalkyl trifluoroethylenes of 3 to 10 carbon atoms, oxyperfluoroalky trifluoroethylenes of 3 to 10 carbons and/or some combinations thereof.

6. The method of claim 1 wherein said comonomer is selected from the group consisting of perfluoroalkenes, chlorotrifluoroethylene, dichlorodifluoroethylene, hexafluoropropene, perfluoro(n-propyl vinyl ether and/or some combination thereof.

7. The method of claim 1 wherein a catalyst initiates said method, said catalyst selected from the group consisting of potassium persulfate, ammonium persulfate, disuccinic acid peroxide, disuccinic acid peroxide and ammonium persulfate in a ratio of 15.9 to 1 respectively and/or some combination thereof.

* * * * *